United States Patent
Kurita (10) Patent No.: US 9,048,050 B2
(45) Date of Patent: Jun. 2, 2015

(54) ELECTRIC POWER SUPPLY CONTROL APPARATUS FOR VEHICLE

(71) Applicant: DENSO CORPORATION, Kariya, Aichi-pref. (JP)

(72) Inventor: Toyoaki Kurita, Obu (JP)

(73) Assignee: DENSO CORPORATION, Kariya (JP)

( * ) Notice: Subject to any disclaimer, the term of this patent is extended or adjusted under 35 U.S.C. 154(b) by 281 days.

(21) Appl. No.: 13/765,083

(22) Filed: Feb. 12, 2013

(65) Prior Publication Data

US 2013/0265005 A1 Oct. 10, 2013

(30) Foreign Application Priority Data

Apr. 5, 2012 (JP) .................................. 2012-86665

(51) Int. Cl.
| | | |
|---|---|---|
| *H02J 7/00* | (2006.01) | |
| *H01H 47/02* | (2006.01) | |
| *B60L 11/18* | (2006.01) | |
| *B60L 15/00* | (2006.01) | |

(52) U.S. Cl.
CPC ................ *H01H 47/02* (2013.01); *B60L 11/18* (2013.01); *B60L 11/1809* (2013.01); *Y02T 10/7005* (2013.01); *B60L 11/1812* (2013.01); *B60L 15/007* (2013.01); *B60L 2260/26* (2013.01); *Y02T 90/14* (2013.01); *Y02T 90/127* (2013.01)

(58) Field of Classification Search
CPC ............................ Y02T 90/14; Y02T 10/7005
USPC ......................................................... 320/109
See application file for complete search history.

(56) References Cited

U.S. PATENT DOCUMENTS

| | | | | |
|---|---|---|---|---|
| 2006/0071557 | A1* | 4/2006 | Osawa et al. ................. | 307/10.1 |
| 2009/0212627 | A1* | 8/2009 | Sakata et al. ................. | 307/10.7 |
| 2010/0127663 | A1* | 5/2010 | Furukawa et al. ............ | 320/134 |
| 2010/0133914 | A1 | 6/2010 | Kang et al. | |
| 2011/0169448 | A1* | 7/2011 | Ichikawa ....................... | 320/109 |
| 2012/0268066 | A1 | 10/2012 | Endo et al. | |
| 2013/0268158 | A1* | 10/2013 | Kurita .......................... | 701/32.8 |

FOREIGN PATENT DOCUMENTS

JP 2009-27848 2/2009

OTHER PUBLICATIONS

Office Action (2 pages) dated Mar. 20, 2015, issued in corresponding Japanese Application No. 2012-086665 and English translation (3 pages).

* cited by examiner

*Primary Examiner* — Suresh Memula
(74) *Attorney, Agent, or Firm* — Nixon & Vanderhye PC (57) ABSTRACT

In an electric power supply control apparatus for a motor in a hybrid vehicle or an electric vehicle, when a main relay is switched over from an on-state to an off-state, only one of its positive-side switch and negative-side switch is turned off to provide a one-side off-state. Thus the numbers of operations of its switches are reduced in comparison to a system, in which both switches are turned off. When a charging relay is switched over from an on-state to an off-state, only one of a positive-side switch and a negative-side switch is turned off to provide a one-side off-state. Thus the numbers of operations of its switches are also reduced.

6 Claims, 9 Drawing Sheets

MODE I

FIG. 5

MODE III

FIG. 4A
MODE II (c): ONE-SIDE OFF

FIG. 4B
MODE II (b): ONE-SIDE OFF

FIG. 4C
MODE II (a): BOTH-SIDE OFF

FIG. 6A
MODE IV(a): BOTH-SIDE OFF

FIG. 6B
MODE IV(b): ONE-SIDE OFF

FIG. 6C
MODE IV(c): ONE-SIDE OFF

ELECTRIC POWER SUPPLY CONTROL APPARATUS FOR VEHICLE

CROSS REFERENCE TO RELATED APPLICATION

This application is based on and incorporates herein by reference Japanese patent application No. 2012-86665 filed on Apr. 5, 2012.

TECHNICAL FIELD

The present disclosure relates to an electric power supply control apparatus for a vehicle, which has a motor as a drive power source for a vehicle and a battery as an electric power source for the motor.

BACKGROUND

Electric vehicles or hybrid vehicles, which have a motor as a drive power source for a vehicle, are proposed recently from the standpoint of social demands of low fuel consumption and low exhaust emission. JP 2009-27848A discloses one exemplary electric power supply control system for a vehicle. This system is provided with a relay (contactor), which has a positive-side switch and a negative-side switch, between a motor and a fuel cell stack. The motor is a drive power source for a vehicle and the fuel cell stack is an electric power source for the motor. In this power supply control system, the following control is proposed for improving durability of the relay. When the relay is switched over to an off-state, both of the positive-side switch and the negative-side switch are turned off at different timings with a certain delay therebetween. The order of turning off the positive-side switch and the negative-side switch is reversed at every predetermined number of switching operations. Thus arc discharges are generated when the switches are turned off evenly at the positive switch and the negative switch.

However, the positive-side switch and the negative-side switch are turned off with only the certain shift in timing when the relay is turned off. The number of operations of each switch is not decreased, because both of the positive-side switch and the negative-side switch are turned off. It is therefore not possible to prolong the period required for the number of switching operations reaches an allowable upper limit and to improve durability life of the relay.

SUMMARY

It is therefore an object to provide an electric power supply control apparatus for a vehicle, which decreases the number of switching operations of a relay and improves durability life.

For achieving the above object, an electric power supply control apparatus for a vehicle, which includes a motor provided as a drive power source for a vehicle and a battery provided as an electric power source for the motor, is configured to have a main relay and a relay control unit. The main relay is provided between the motor and the battery and includes a positive-side switch and a negative-side switch. The relay control unit is configured to control the main relay to a one-side off-state, in which only one of the positive-side switch and the negative-side switch of the main relay is turned off, when the main relay is switched over from an on-state to the off-state.

According to the electric power supply control apparatus, when the main relay is switched from the on-state to the off-state, the main relay is switched to the one-side off-state, in which only one of the positive-side switch and the negative-side switch of the main relay is turned to the off-state. Accordingly, the numbers of operations of the positive-side switch and the negative-side switch can be reduced in comparison to a system, in which both the positive-side switch and the negative-side switch are switched to the off-state. The numbers of operations of the switches of the main relay are reduced and hence the durability life of the main relay is prolonged.

BRIEF DESCRIPTION OF THE DRAWINGS

The above and other objects, features and advantages of an electric power supply control apparatus will become more apparent from the following detailed description. In the drawings.

DETAILED DESCRIPTION OF THE EMBODIMENT

Figure 1:
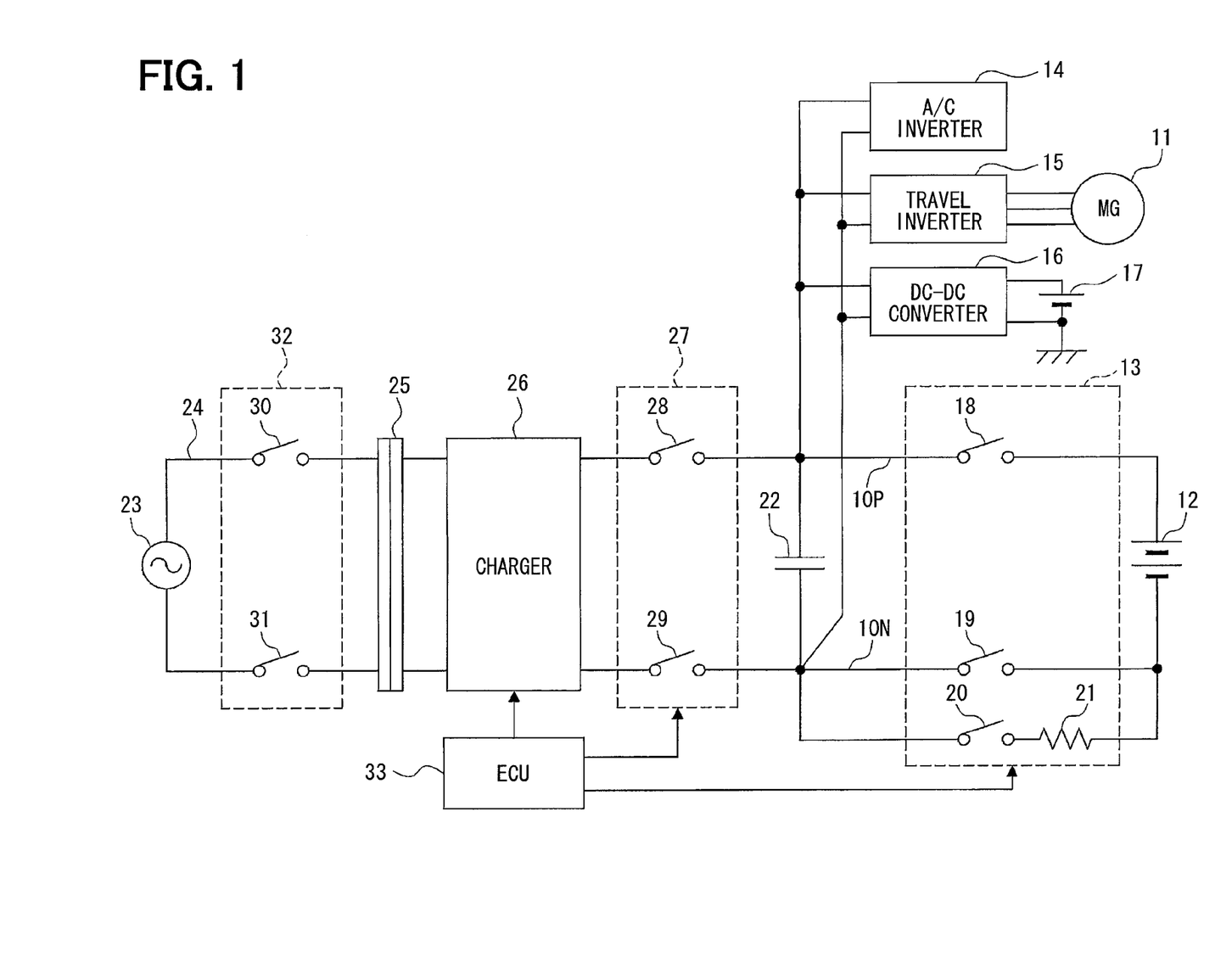
FIG. 1 is a block diagram showing an electric power supply control system for a vehicle according to one embodiment.
Figure 2:
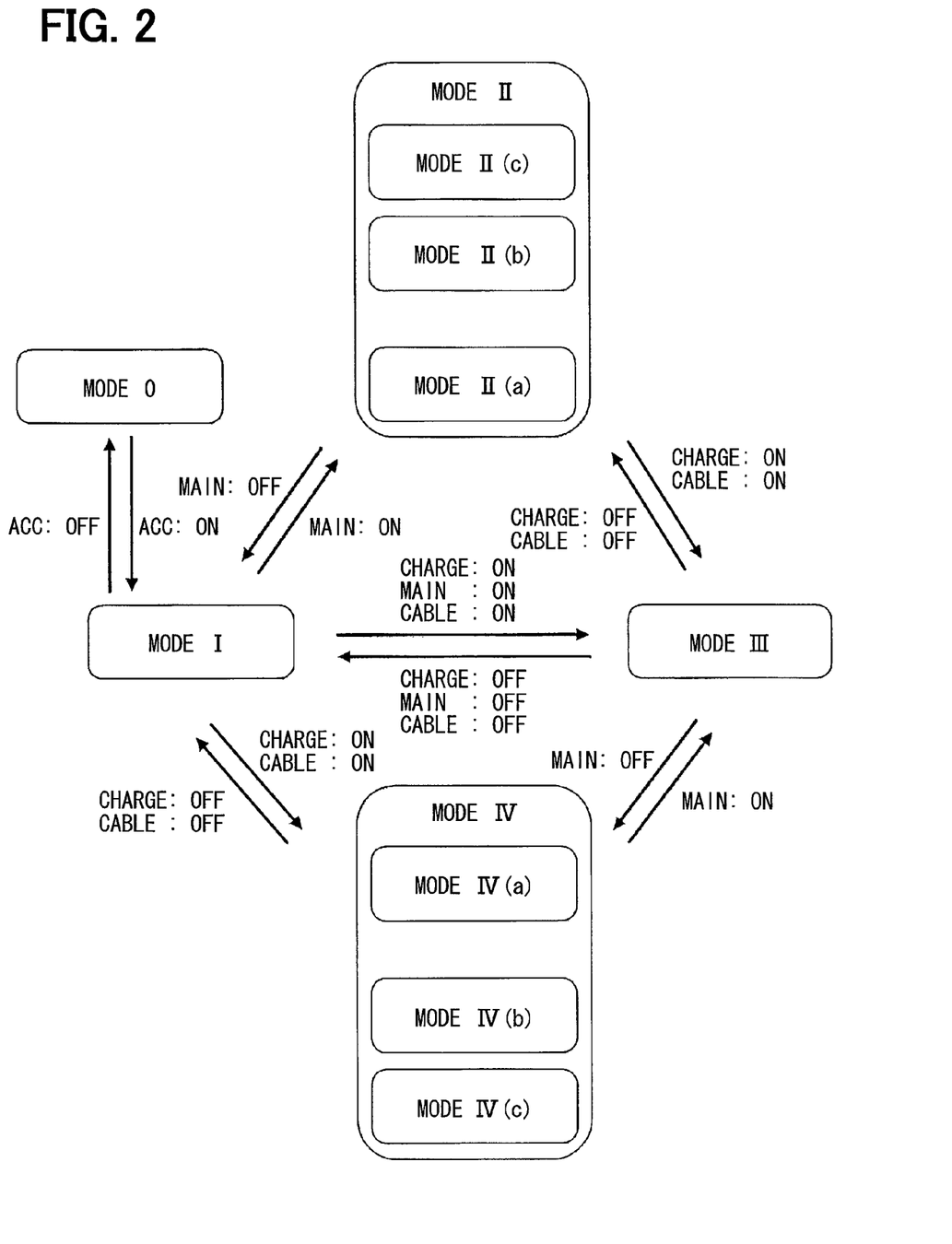
FIG. 2 is a diagrammatic illustration showing switching patterns of power supply modes.

Referring first to FIG. 1, an electric power supply control system for a vehicle will be described. The vehicle may be, for example, a plug-in hybrid vehicle or an electric vehicle, which are chargeable from an external electric power source provided outside the vehicle.

A motor-generator (motor) 11 and a high-voltage battery (battery) 12 are mounted in a vehicle and connected via a positive-side cable 10P and a negative-side cable 10N. The motor 11 is a drive power source for a vehicle. The high-voltage battery 12 is an electric power source for the motor-generator 11. An inverter 14 for air-conditioning and an inverter 15 for vehicle travel are connected to the high-voltage battery 12 through a main relay 13. The motor-generator 11 is connected to the inverter 15 for vehicle travel. In addition, a DC-DC converter 16 is connected to the high-voltage battery 12 through the main relay 13. An accessory battery (low voltage battery) 17 is connected to the DC-DC converter 16. Various electric devices (not shown) are connected to the accessory battery 17 through an accessory relay (no shown).

The main relay 13 is provided with switches 18 and 19 at a positive-side (high potential side) and a negative-side (low potential side), respectively. That is, the switches 18 and 19 are provided in the positive-side cable 10P and the negative-side cable 10N, respectively. A pre-charge switch 20 and a resistor 21 are connected in series to the negative-side of the high-voltage battery 12 in parallel to the switch 19. When the main relay 13 is turned on (both positive-side switch 18 and the negative-side switch 10 are turned on), the switches 19 and 20 at the negative-side are operated in such a manner that the switch 20 for pre-charging is first turned on, the switch 19 is then turned on and the switch 20 is then turned off. A smoothing capacitor 22 is connected between the main relay 13 and an electric load (inverters 14, 15, converter 16 and the like).

A charging device (charger) 26 is connected to an electric connector 25, which is connected through a charging cable 24 to a commercial electric power source (external electric power source) 23 provided outside a vehicle. The high-voltage battery 12 is connected to the charger 26 through a charging relay 27 and the main relay 13. The charging relay 27 has a positive-side switch 28 and a negative-side switch 29 connected to the positive-side cable 10P and the negative-side cable 10N, respectively. The charging cable 24 is provided with a cable relay 32, which is built in the cable 24 and has two switches 30 and 31 for the positive-side and the negative-side.

Operations of the main relay 13, the charging relay 27 and the like are controlled by an electronic control unit (ECU) 33. The ECU 33 is formed primarily of a microcomputer and performs electric power supply control routines of FIG. 7 to FIG. 10 as described later so that the electric power supply mode is switched over among plural power supply modes (power supply mode 0, first power supply mode I, second power supply mode II, third power supply mode III, and fourth power supply mode IV).

[Power Supply Mode 0]

In the power supply mode 0, the main relay 13 is fully turned off (both the positive-side and the negative-side switches 18 to 20 are turned off) and the charging relay 27 is fully turned off (both the positive-side and the negative-side switches 28 and 29 are turned off). Further, the cable relay 32 is fully turned off (both switches 30 and 31 are turned off). By further turning off the accessory relay (not shown), all the electric power sources (high-voltage battery 12, accessory battery 17 and the commercial power source 23) are in the off-state in this mode 0.

[First Power Supply Mode I]

Figure 3:
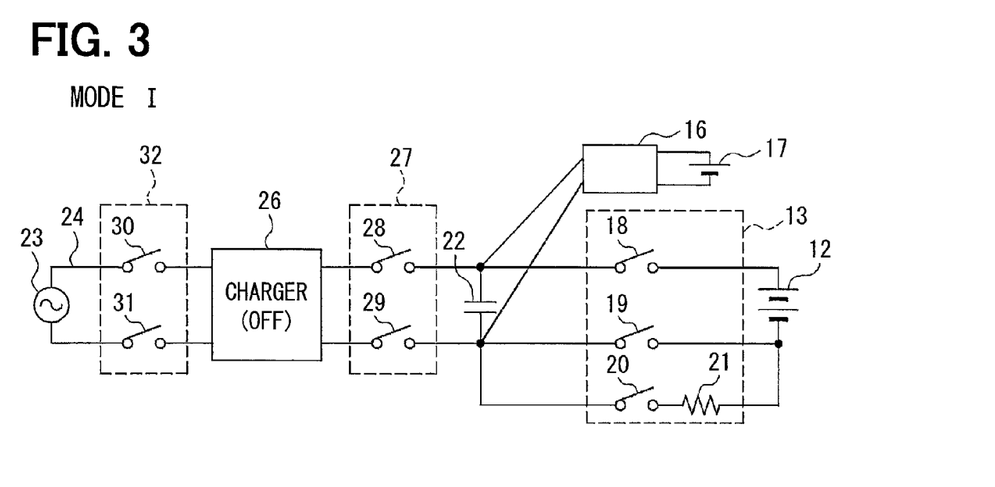
FIG. 3 is a schematic diagram showing a first electric power supply mode I.

As shown in FIG. 3, in the first power supply mode I, the main relay 13, the charging relay 27 and the cable relay 32 are all turned off as in the power supply mode 0 and only the accessory relay is tuned on. Thus, the accessory battery 17 is connected to a system in this mode so that the electric power of the accessory battery 17 is usable. In any of the first to the fourth power supply modes I to IV, the accessory relay is held in the on-state.

[Second Power Supply Mode II]

Figure 4A:
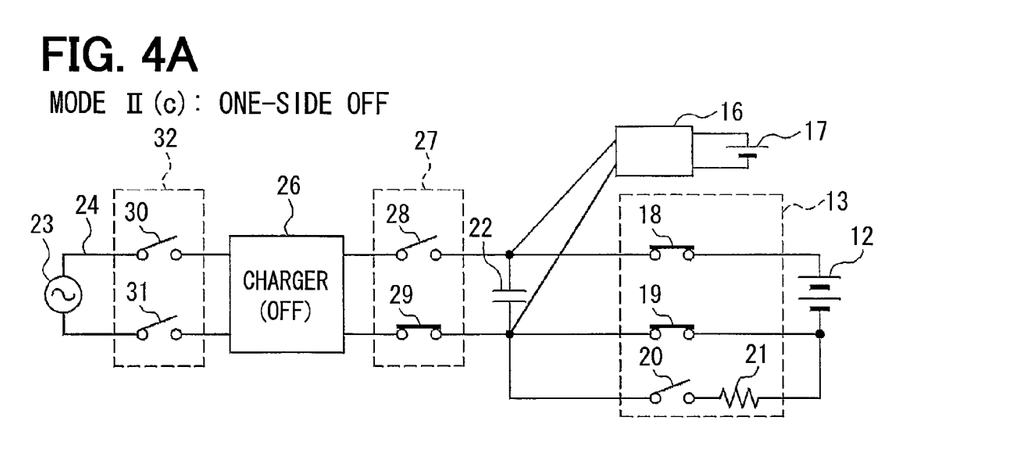
FIG. 4A, FIG. 4B and FIG. 4C are schematic diagrams showing plural examples of a second electric power supply mode II.
Figure 4B:
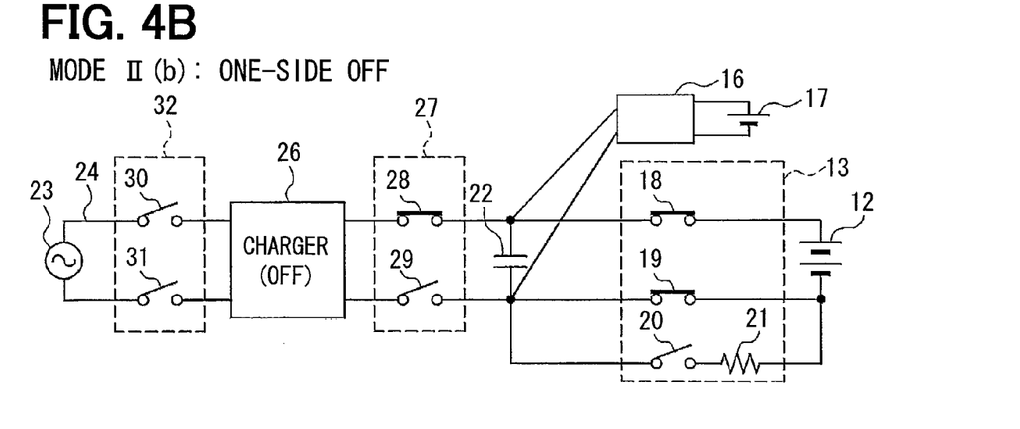
Figure 4C:
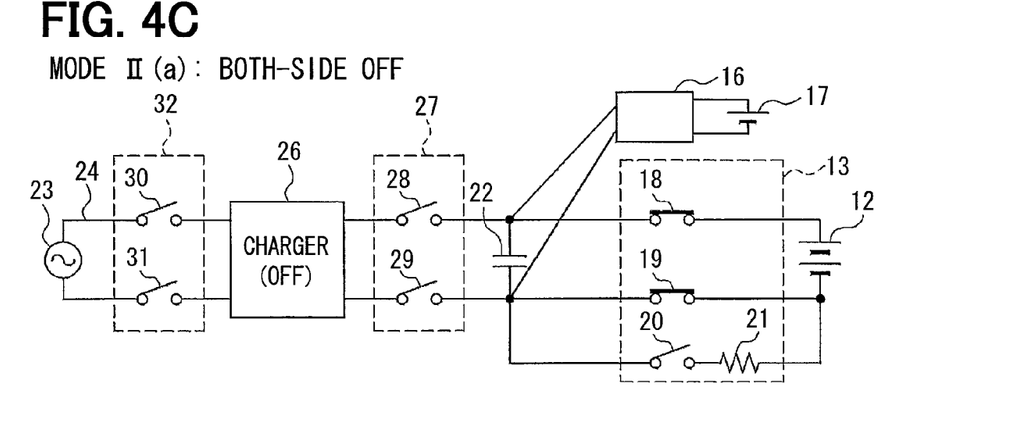

As shown in FIG. 4A to FIG. 4C, in the second power supply mode II, the main relay 13 is turned on (both the positive-side and the negative-side switches 18 and 19 are turned on) and the charging relay 27 is fully turned off as shown in FIG. 4C or turned off at only one side (one of positive-side and negative-side) as shown in FIG. 4A and FIG. 4B. In addition, the cable relay 32 is fully turned off. Thus the high-voltage battery 12 and the accessory battery 17 are connected to the system in this mode II so that the electric power of high-voltage battery 12 and the electric power of accessory battery 17 are usable.

This electric power supply mode II has the following three modes, a power supply mode II(a), a power supply mode II(b) and power supply mode II(c), in which the off-states of the charging relay 27 are different.

In the power supply mode II(a) shown in FIG. 4C, both the positive-side switch 28 and the negative-side switch 29 of the charging relay 27 are turned off so that the charging relay 27 is fully turned off.

In the power supply mode II(b), the positive-side switch 28 and the negative-side switch 29 of the charging relay 27 are turned on and off, respectively, so that the charging relay 27 is turned off at only one side, that is, at only the negative-side.

In the power supply mode II(c), the positive-side switch 28 and the negative-side switch 29 of the charging relay 27 are turned off and on, respectively, so that the charging relay 27 is turned off at only one side, that is, at only the positive-side.

[Third Power Supply Mode III]

Figure 5:
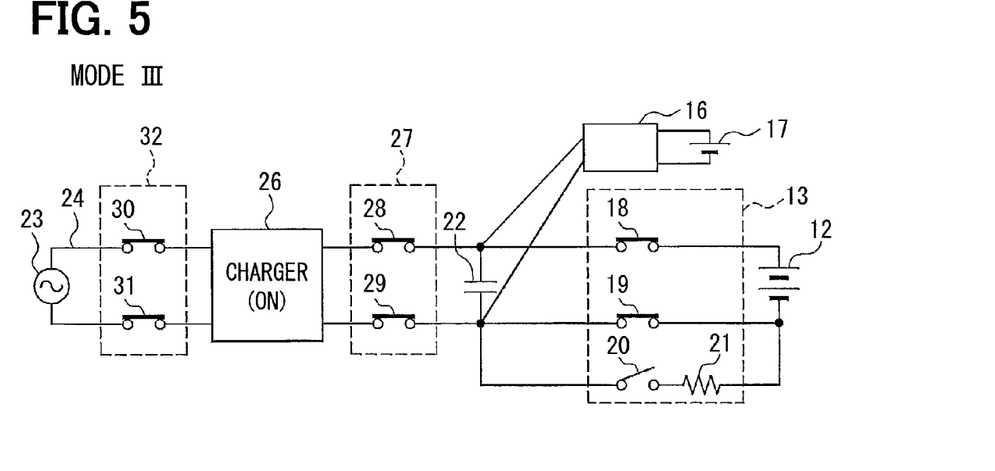
FIG. 5 is a schematic diagram showing a third electric power supply mode III.

As shown in FIG. 5, in the third power supply mode III, the main relay 13 is turned on and the charging relay 27 is also turned on with both of the positive-side switch 28 and the negative-side switch 29 being turned on. Further, the cable relay 32 is turned on with both of the switches 30 and 31 being turned on. Thus, all the electric power sources, that is, the high-voltage battery 12, the accessory battery 17 and the commercial power source 23, are connected to the system. Thus in this mode, the high-voltage battery 12 is charged by the electric power of the commercial power source 23 and the electric power of the commercial power source 23 and the electric power of the accessory battery 17 are usable.

[Fourth Power Supply Mode IV]

Figure 6A:
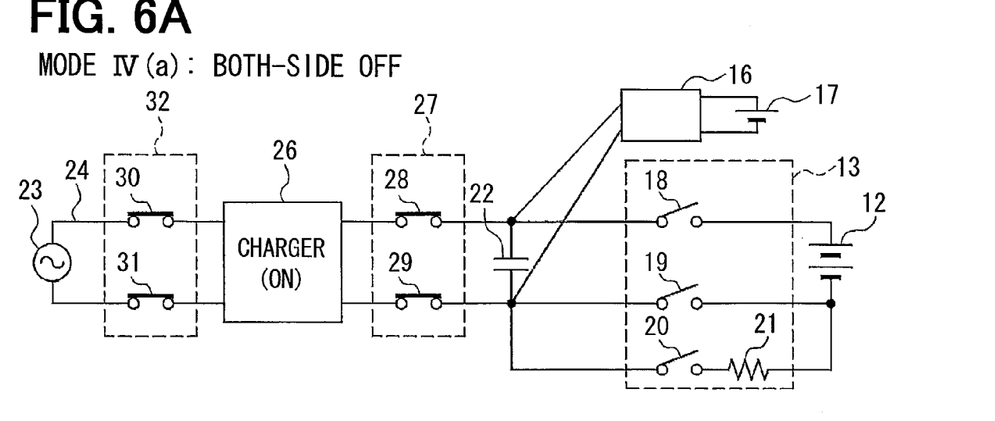
FIG. 6A, FIG. 6B and FIG. 6C are schematic diagrams showing plural examples of a fourth electric power supply mode IV.
Figure 6B:
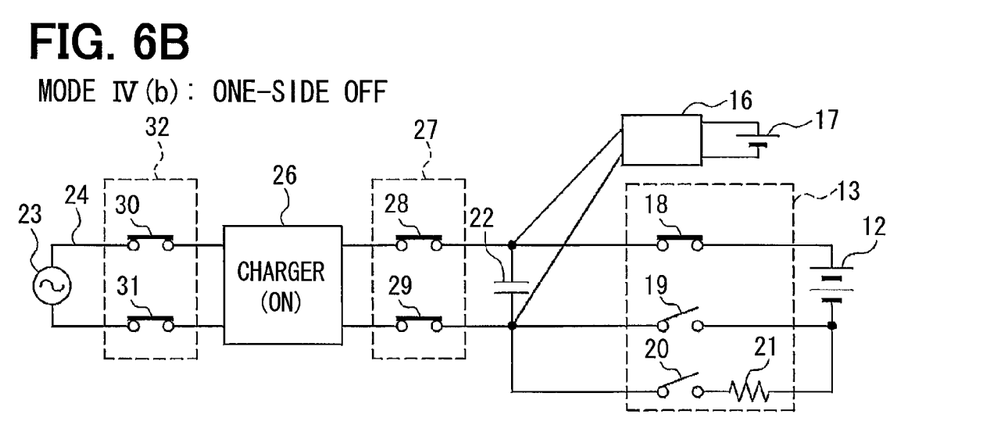
Figure 6C:
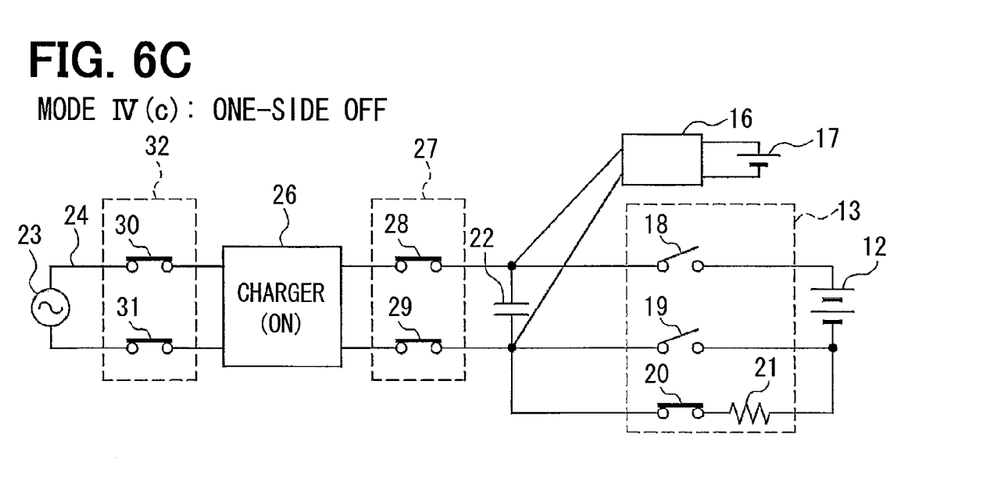

As shown in FIG. 6A to FIG. 6C, in the fourth electric power supply mode IV, the charging relay 27 and the cable relay 32 are turned on and the main relay 13 is fully turned off or turned off at only one side. Thus the commercial power source 23 and the accessory battery 17 are connected to the system in this mode so that the electric power of the commercial power source 23 and the electric power of the accessory battery 17 are usable.

This fourth electric power supply mode IV has the following three modes, a power supply mode IV(a) shown in FIG. 6A, a power supply mode IV(b) shown in FIG. 6B and a power supply mode IV(c) shown in FIG. 6C, in which the off-states of the main relay 13 are different.

In the power supply mode IV(a) shown in FIG. 6A, both of the positive-side switch 18 and the negative-side switches 19, 20 of the main relay 13 are turned off so that the main relay 13 is fully turned off.

In the power supply mode IV(b) shown in FIG. 6B, the positive-side switch 18 and the negative-side switches 19, 20 of the main relay 13 are turned on and off, respectively, so that the main relay 13 is turned off at only one side, that is, at only the negative-side.

In the power supply mode IV(c) shown in FIG. 6C, the positive-side switch 18 and the negative-side switch 20 (or switch 19) of the main relay 13 are turned off and on, respectively, so that the main relay 13 is turned off at only one side, that is, at only the positive-side.

According to the above-described arrangement, when the power supply mode is switched or changed from the third mode III to the fourth mode IV, that is, when the main relay 13 is switched over from the on-state to the off-state, the power supply mode is switched to the power supply mode IV(b) or the mode IV(c). Thus, the main relay 13 is switched to the off-state at only one side, that is, only a part of the switches 18 to 20 of the positive-side and the negative-side is turned off and the other part of the switched 18 to 20 is not turned off but maintained in the on-state. As a result, the numbers of operations of the switches 18 to 20 are reduced in comparison to a system, in which all of the positive-side switch 18 and the negative-side switches 19, 20 turned to the off-state.

Further, when the main relay 13 is turned off at only one side, one of the positive-side switch 18 and the negative-side switch 19, 20, which has been operated less number of times, is selected and turned off. As a result, the numbers of times of operations of the positive-side switch 18 and the negative-side switch 19, 20 of the main relay 13 are reduced evenly.

When the power supply mode is switched from the mode III to the power supply mode II, that is, when the charging relay 27 is switched over from the on-state to the off-state, the power supply mode is switched from the power supply mode II(b) to the power supply mode II(c). Thus the charging relay 27 is switched to the off-state at only one side. That is, only one of the positive-side switch 28 and the negative-side switch 29 is turned off. The number of times of the operations of the positive-side switch 28 and the negative-side switch 29 is thus reduced in comparison to a system, in which both of the switches 28 and 29 are turned off.

When the charging relay 27 is turned off at only one side, one of the positive-side switch 28 and the negative-side switch 29, which has been operated less number of times, is selected and turned off. The number of times of the positive-side switch 28 and the negative-side switch 29 of the charging relay 27 is thus reduced evenly.

The power supply mode switching operation described above is performed by the ECU 33 in accordance with electric power supply control routines shown in FIG. 7 to FIG. 10. Detailed processing of these routines will be described below.

[Electric Power Supply Control Routine]

Figure 7:
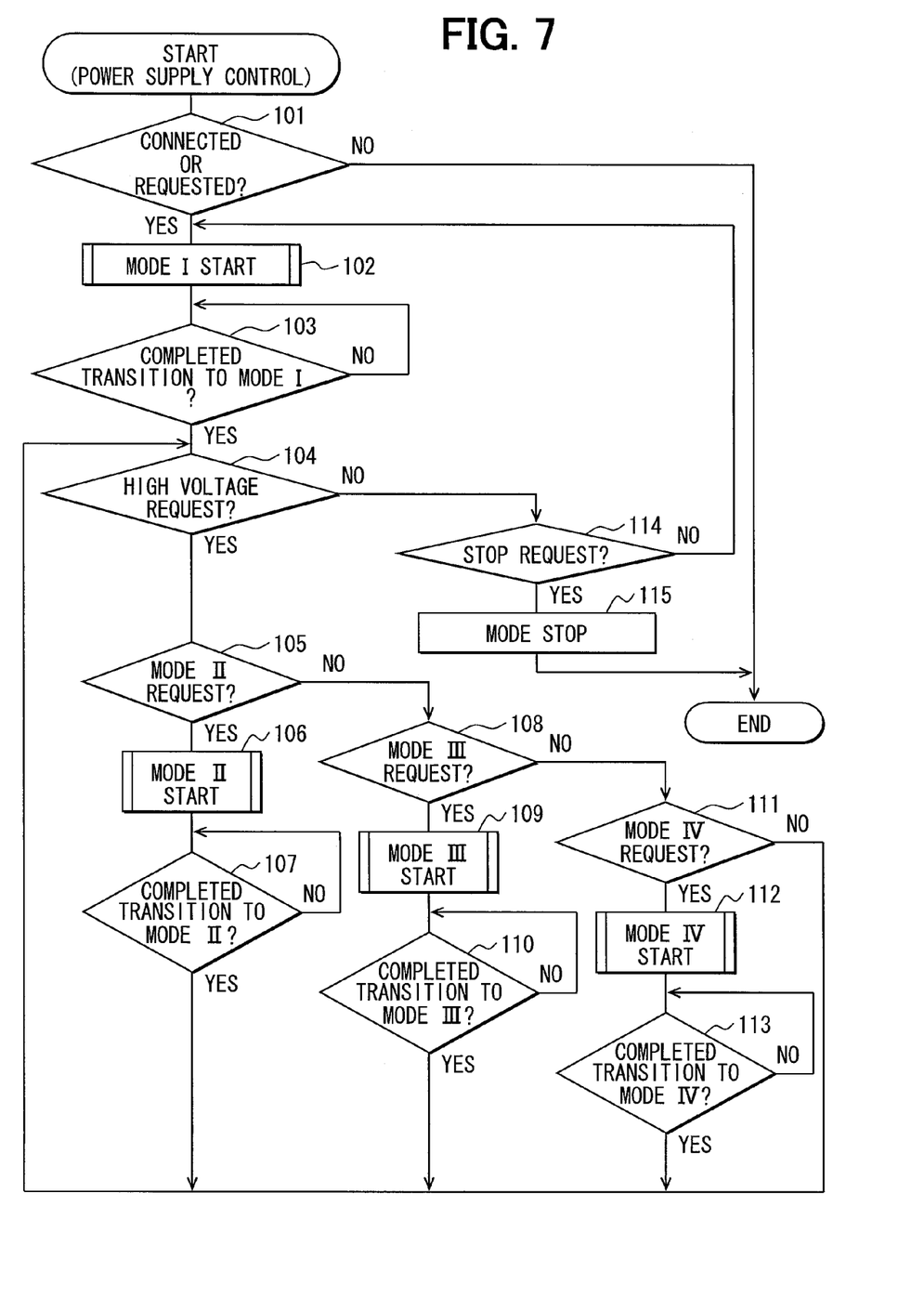
FIG. 7 is a flowchart showing a processing routine of electric power supply control executed in the embodiment.

An electric power supply control routine shown in FIG. 7 is repeated at a predetermined interval by the ECU 33, which operates as a relay control unit. When this routine is started, it is first checked at step 101 whether the charging cable 24 is connected or a system start request is present. If it is determined at step 101 that the charging cable 24 is not connected and the system start request is not present either, the electric power supply mode 0, which indicates that the power supply is not necessitated, is maintained and this routine is finished.

If it is determined at step 101 that the charging cable 24 is connected or the system start request is present, the power supply mode I start processing is executed at step 102 to activate the power supply mode I so that the mode is switched to or maintained at the power supply mode I (FIG. 3). Then, it is checked at step 103 whether the transition or switching to the power supply mode I is completed. When it is determined that the transition to the power supply mode I is completed, it is checked at step 104 whether a request for using high voltage power is present.

Figure 8:
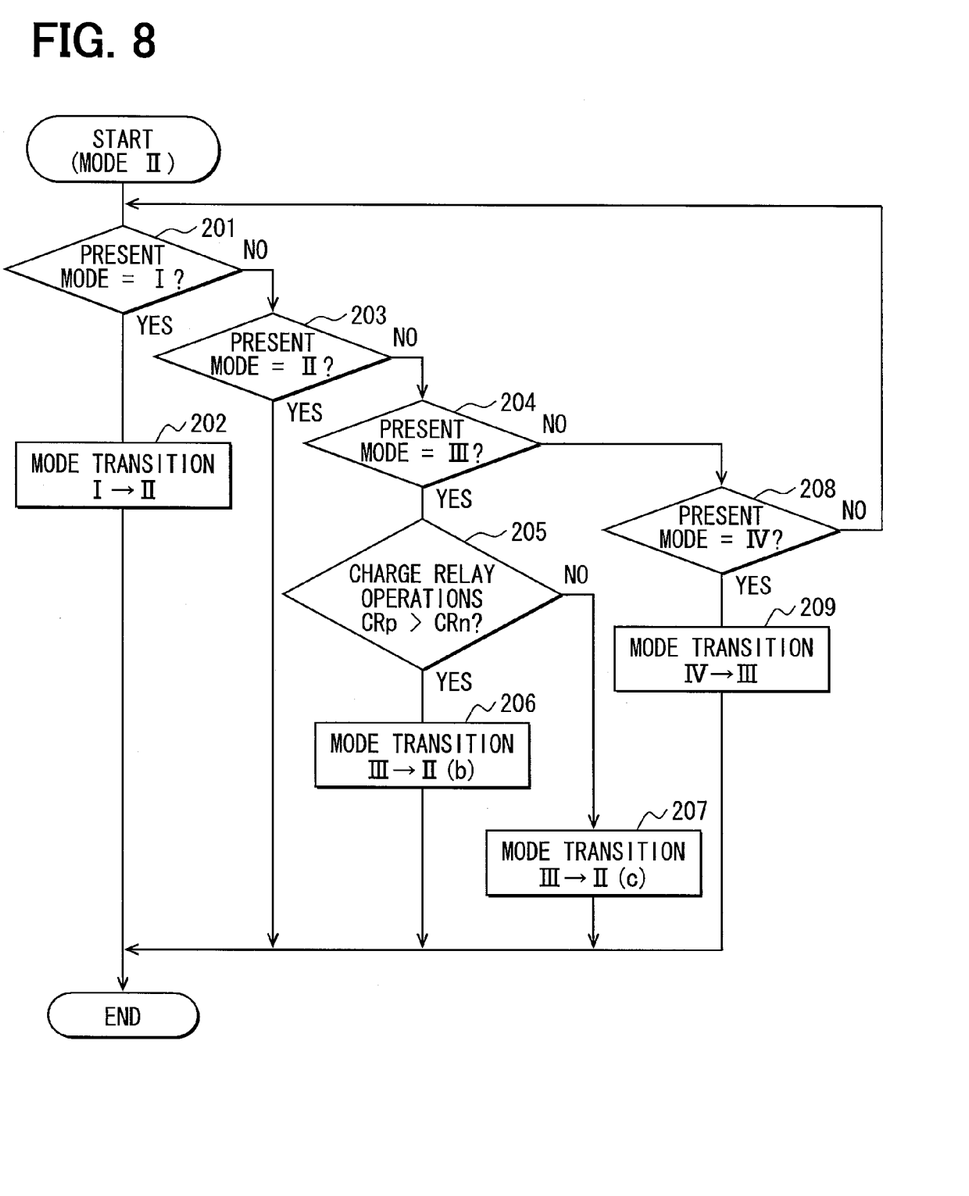
FIG. 8 is a flowchart showing a processing routine of starting the second electric power supply mode II.

If it is determined at step 104 that the request for using high voltage power (high voltage battery 12) is present, it is checked at step 105 whether a start request for the power supply mode II is present. If it is determined that the start request for the power supply mode II is present, a power supply mode II start routine shown in FIG. 8 is executed at step 106 and the power supply mode is switched to or maintained at the power supply mode II (FIGS. 4A to 4C). Then it is checked at step 107, whether a transition to the power supply mode II is completed. If it is determined that the transition to the power supply mode II is completed, step 104 is executed again.

Figure 9:
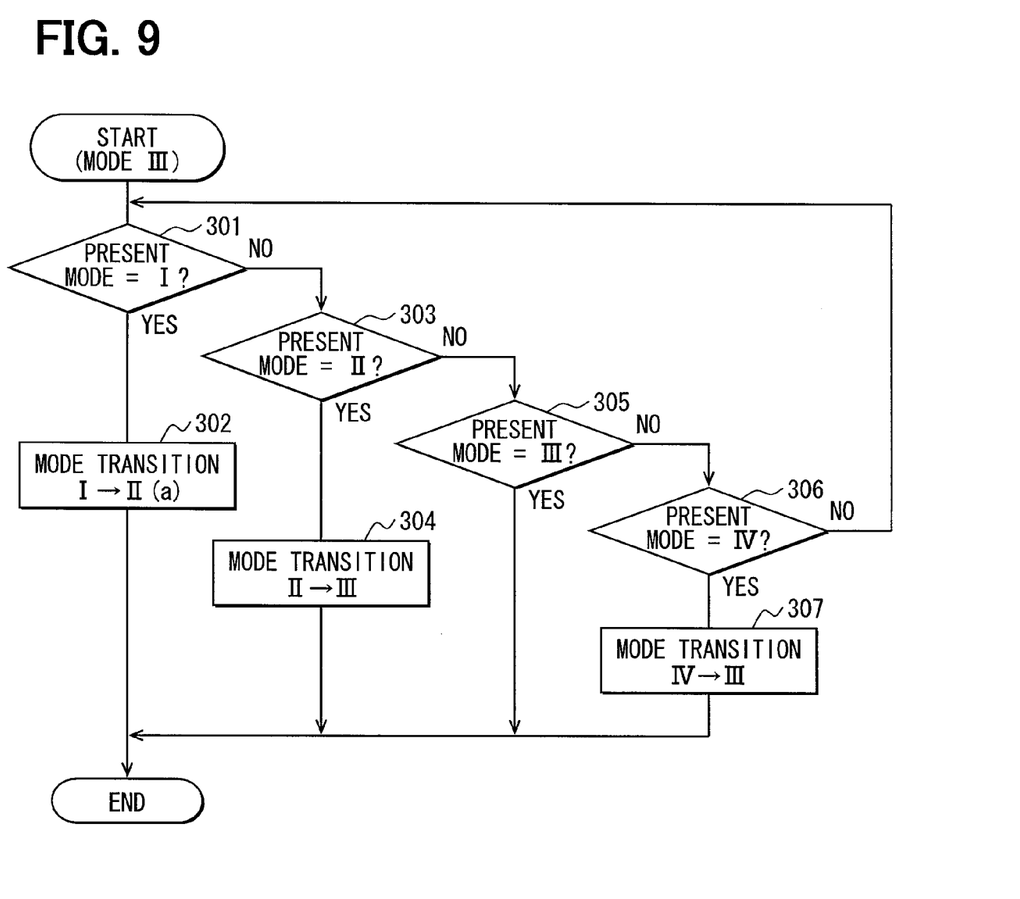
FIG. 9 is a flowchart showing a processing routine of starting the third electric power supply mode III.

If it is determined at step 105 that the start request for the power supply mode II is not present, it is checked at step 108 whether a start request for the power supply mode III is present. If it is determined that the start request for the power supply mode III is present, a power supply mode III start routine shown in FIG. 9 is executed at step 109 and the power supply mode is switched to or maintained at the power supply mode III (FIG. 5). Then it is checked at step 110 whether a transition to the power supply mode III is completed. If it is determined that the transition to the power supply mode III is completed, step 104 is executed again.

Figure 10:
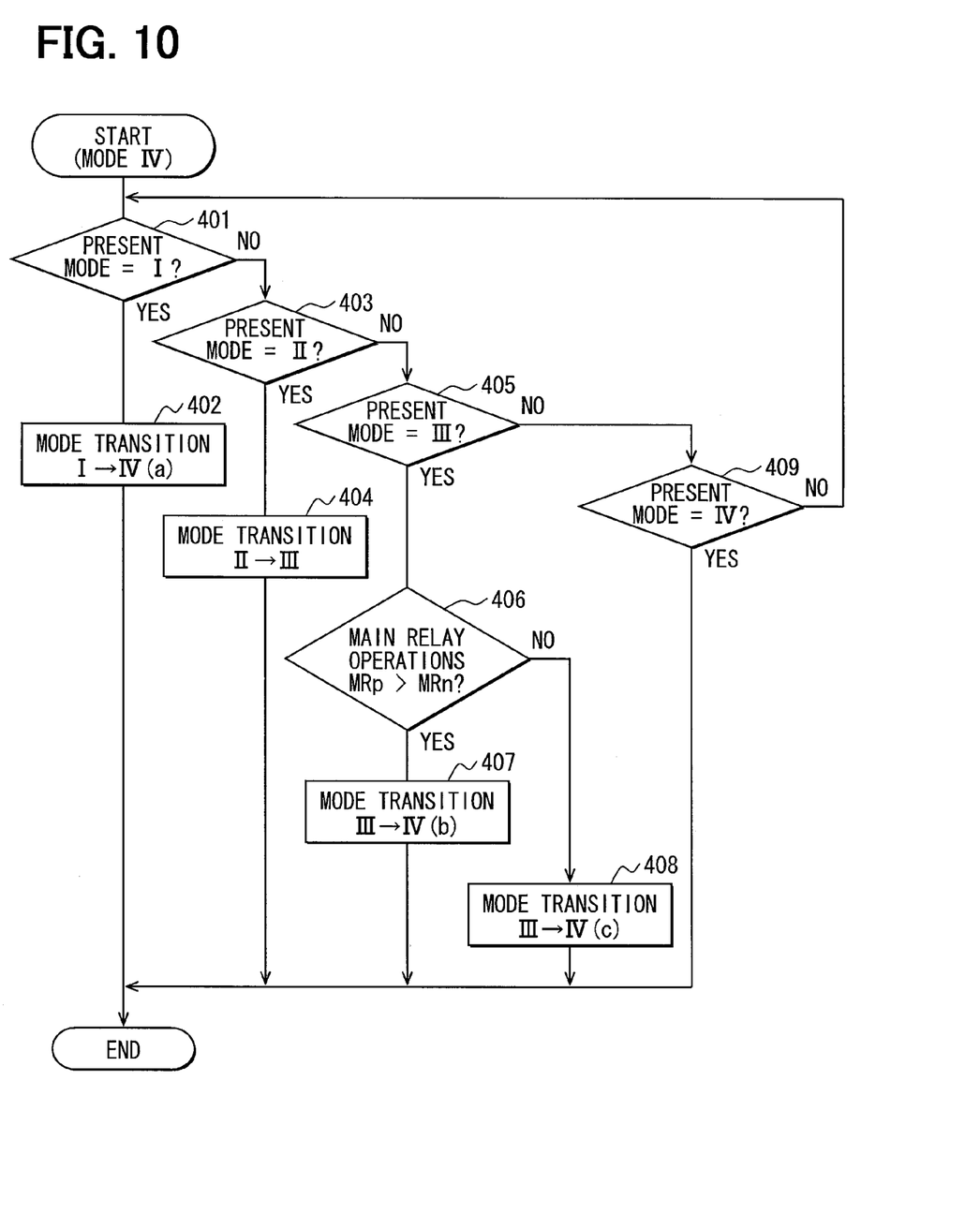
FIG. 10 is a flowchart showing a processing routine of starting the fourth electric power supply mode IV.

If it is determined at step 108 that the start request for the power supply mode III is not present, it is checked at step 111 whether a start request for the power supply mode IV is present. If it is determined that the start request for the power supply mode IV is present, a power supply mode IV start routine shown in FIG. 10 is executed at step 112 and the power supply mode is switched to or maintained at the power supply mode IV (FIGS. 6A to 6C). Then it is checked at step 113 whether a transition to the power supply mode IV is completed. If it is determined that the transition to the power supply mode IV is completed, step 104 is executed again.

If it is determined at step 104 that the request for using the high voltage is not present, it is checked at step 114 whether a request for stopping a system is present. If it is determined that the request for stopping a system is not present, step 102 is repeated. If it is determined at step 114 thereafter that the request for stopping a system is present, electric power supply mode stop processing is executed at step 115. The power supply mode is switched to the power supply mode 0 and this routine is finished.

[Electric Power Supply Mode II Start Processing Routine]

The electric power supply mode II start processing routine shown in FIG. 8 is a sub-routine executed at step 106 in the power supply control routine shown in FIG. 7. When this routine is started, it is first checked at step 201 whether the present mode is the power supply mode I. If it is determined that the present mode is the power supply mode I, the power supply mode is switched from the power supply mode I to the power supply mode II(a) at step 202. In this transition processing from the power supply mode I to the power supply mode II(a), the main relay 13 is switched over to the on-state thereby to switch over the power supply mode from the power supply mode I to the power supply mode II(a).

If it is determined at step 201 that the present mode is not the power supply mode I, it is further checked at step 203 whether the present mode is the power supply mode II (either one of the modes II(a) to II(c)). If it is determined that the present mode is the power supply mode II, the power supply mode II is maintained and this routine is finished.

If it is determined at step 203 that the present mode is not the power supply mode II, it is further checked at step 204 whether the present mode is the power supply mode III. If it is determined that the present mode is the power supply mode III, the power supply mode is switched from the mode III to the power supply mode II. In this case, the power supply mode is switched to the power supply mode II(b) or II(c), so that the charging relay 27 is changed to the one-side off-state, in which one of the positive-side and the negative-side switches 28 and 29 is turned off.

Specifically, it is checked at step 205 whether the number of operations CRp of the positive-side switch 28 of the charging relay 27 is larger than that CRn of the negative-side switch 29. The number of operations is, for example, any one of the number of turn-off operations, the number of turn-on operations and the number of turn-on and off operations.

If it is determined at step 205 that the number of operations CRp of the positive-side switch 28 of the charging relay 27 is larger than that CRn of the negative-side switch 29, that is, the number of operations CRn of the negative-side switch 29 is smaller than that CRp of the positive-side switch 28, the power supply mode is switched from the mode III to the power supply mode II(b) at step 206. In this transition processing from the power supply mode III to the power supply mode II(b), the charging relay 27 is switched over to the one-side off-state of the negative-side, in which the positive-side switch 28 is turned on and the negative-side switch 29 are turned off. The cable relay 32 is fully turned off thereby to switch over the power supply mode from the mode III to the power supply mode II(b).

If it is determined at step 205 that the number of operations CRp of the positive-side switch 28 of the charging relay 27 is equal to or smaller than that CNp of the negative-side switch 29, that is, the number of operations CRp of the positive-side switch 28 is not larger than that CRn of the negative-side switch 29, the power supply mode is switched from the mode III to the power supply mode II(c) at step 207. In this transition processing from the power supply mode III to the power supply mode II(c), the charging relay 27 is switched over to the one-side off-state of the positive-side (the negative-side switch 29 is turned on and the positive-side switch 28 is turned off). The cable relay 32 is fully turned on thereby to switch over from the power supply mode III to the power supply mode II(c).

If it is determined at step 204 that the present mode is not the power supply mode III, it is checked at step 208 whether the present mode is the power supply mode IV. If it is determined that the present mode is the power supply mode IV, the power supply mode is switched from the power supply mode IV to the power supply mode III at step 209. In this transition processing from the power supply mode IV to the power supply mode III, the main relay 13 is turned on and the power supply mode is switched from the mode IV to the power supply mode III.

[Power Supply Mode III Start Processing Routine]

The power supply mode III start routine shown in FIG. 9 is a sub-routine, which is executed in step 109 of the electric power supply control routine shown in FIG. 7. When this routine is started, it is first checked at step 301 whether the present mode is the power supply mode I. If it is determined that the present mode is the power supply mode I, the power supply mode transition processing for transition from the mode I to the power supply mode II(a) is executed at step 302. In this power supply mode transition processing for transition from the mode I to II(a), the main relay 13 is switched over to the on-state so that the power supply mode is transitioned from the mode I to the power supply mode II(a).

If it is determined at step 301 that the present mode is not the power supply mode I, it is further checked at step 303 whether the present mode is the power supply mode II (either one of the modes II(a) to II(c)). If it is determined that the present mode is the power supply mode II, the power supply mode transition processing from the mode II to the power supply mode III is executed at step 304. In this power supply transition processing from the mode II to the power supply mode III, the charging relay 27 is switched to the on-state and the cable relay 32 is switched to the on-state thereby to switch over from the power supply mode II to the power supply mode III.

If it is determined at step 303 that the present mode is not the power supply mode II, it is further checked at step 305 whether the present mode is the power supply mode III. If it is determined that the present mode is the power supply mode III, the power supply mode III is maintained and this routine is finished.

If it is determined at step 305 that the present mode is not the power supply mode III, it is further checked at step 306 whether the present mode is the power supply mode IV. If it is determined that the present mode is the power supply mode IV, the power supply mode transition processing from the mode IV to the power supply mode III is executed at step 307. In this power supply transition processing from the mode IV to the power supply mode III, the main relay 13 is switched to the on-state to switch over from the power supply mode IV to the power supply mode III.

[Power Supply Mode IV Start Processing Routine]

The electric power supply mode IV start processing routine shown in FIG. 10 is a sub-routine executed at step 112 in the electric power supply control routine shown in FIG. 7. When this routine is started, it is first checked at step 401 whether the present mode is the power supply mode I. If it is determined that the present mode is the power supply mode I, the power supply mode is switched from the power supply mode I to the power supply mode IV(a) at step 402. In this transition processing from the power supply mode I to the power supply mode IV(a), the charging relay 27 is switched over to the on-state and the cable relay 32 is also switched over to the on-state to transfer from the power supply mode I to the power supply mode IV(a).

If it is determined at step 401 that the present mode is not the power supply mode I, it is further checked at step 403 whether the present mode is the power supply mode II (either one of the power supply modes II(a) to II(c)). If it is determined that the present mode is the power supply mode II, the power supply mode transition processing from the mode II to the power supply mode III is executed at step 404. In this power supply mode transition processing from the mode II to the power supply mode III, the charging relay 27 is switched over to the on-state and the cable relay 32 is switched over to the on-state thereby to switch over the mode from the mode II to the power supply mode III.

If it is determined at step 403 that the present mode is not the power supply mode II, it is further checked at step 405 whether the present mode is the power supply mode III. If it is determined that the present mode is the power supply mode III, the power supply mode is switched from the mode III to the power supply mode IV at steps 406 to 408. In this case, the power supply mode is switched to the power supply mode IV(b) or IV(c), so that the main relay 13 is changed to the one-side off-state, in which one of the positive-side and the negative-side switches 28 and 29 is turned off.

Specifically, it is checked at step 406 whether the number of operations MRp of the positive-side switch 18 of the main relay 13 is larger than that MRn of the negative-side switch 19. The number of operations is, for example, any one of the number of turn-off operations, the number of turn-on operations and the number of turn-on and off operations.

If it is determined at step 406 that the number of operations MRp of the positive-side switch 18 of the main relay 13 is larger than that MRn of the negative-side switch 19 (or switch 20), that is, the number of operations MRn of the negative-side switch 19 (or the switch 20) is smaller than or equal to that MRp of the positive-side switch 18, the power supply mode is switched from the power supply mode III to the power supply mode IV(b) at step 407. In this transition processing from the power supply mode III to the power supply mode IV(b), the main relay 13 is switched over to the one side off-state of the negative-side, in which the positive-side switch 18 is turned on and the negative-side switches 19, 20 are turned off. The power supply mode is thus switched from the mode III to the power supply mode IV(b).

If it is determined at step 406 that the number of operations MRp of the positive-side switch 18 of the main relay 13 is equal to or smaller than that MRn of the negative-side switch 19 (or 20), that is, the number of operations MRp of the positive-side switch 18 is not larger than that MRn of the negative-side switch 19 (or 20), the power supply mode is switched from the mode III to the power supply mode IV(c) at step 408. In this transition processing from the power supply mode III to the power supply mode IV(c), the main relay 13 is switched over to the one side off-state of the positive-side, in which the negative-side switch 20 (or 19) is turned on and the positive-side switch 18 is turned off. Thus, the power supply mode is switched from the mode III to the power supply mode IV(c).

If it is determined at step 405 that the present mode is not the power supply mode III, it is checked at step 409 whether the present mode is the power supply mode IV. If it is determined that the present mode is the power supply mode IV, the power supply mode IV is maintained and this routine is finished.

In the above-described embodiment, when the power supply mode is switched from the mode III to the power supply mode IV, that is, when the main relay 13 is switched over from the on-state to the off-state, the power supply mode is switched to the power supply mode IV(b) or the mode IV(c) thereby to control the main relay 13 to the one-side off-state, in which only one of the switches 18 to 20 of the positive-side and the negative-side is switched over to the off-state. Accordingly, the number of operations of the switches 18 to 20 can be reduced in comparison to the system, in which both the positive-side and the negative-side switches 18 to 20 are controlled to the off-state. The period, in which the number of operations of the switches 18 to 20 of the main relay 13 reaches an allowable limit value, can be prolonged, and hence the durability life of the main relay 13 can be prolonged.

When the main relay 13 is controlled to be in the one-side off-state, one of the positive-side switch 18 and the negative-side switches 19, 20 of the main relay 13, the number of operations of which is smaller, is selected and turned off. The number of operations of the positive-side switch 18 and the negative-side switches 19, 20 of the main relay 13 can thus be decreased equally.

When the power supply mode is to be switched over from the mode III to the power supply mode II, that is, when the charging relay 27 is switched over from the on-state to the off-state, the power supply mode is switched to the power supply mode II(b) or the mode II(c) so that the charging relay 27 is switched over to the one-side off-sate, in which only one of the positive-side switch 28 and the negative-side switch 29 is turned off. The number of operations of the switches 28 and 29 can thus be decreased in comparison to the system, in which both the positive-side switch 28 and the negative-side switch 29 are turned off. The period, in which the number of operations of the switches 28 and 29 of the charging relay 27 reaches an allowable limit value, can be prolonged, and hence the durability life of the charging relay 27 can be prolonged.

When the charging relay 27 is to be switched over to the one-side off-state, only one of the positive-side switch 28 and the negative-side switch 29 of the charging relay 27, the number of operations of which is smaller, is selected and switched over to the off-state. As a result, the number of operations of the positive-side switch 28 and the negative-side switch 29 can be equally reduced.

The electric power supply control apparatus according to the above-described embodiment is implemented in a system (for example, an electric power supply control system for a plug-in hybrid vehicle or an electric vehicle, which is chargeable from an outside electric power source), which includes the external power source connector part 25, the charger 26, the charging relay 27 and the like. The electric power supply control apparatus should not be limited to only such an embodiment, but may be implemented in a system (for example, an electric power supply control system for a normal hybrid vehicle), which does not include the external power source connector part 25, the charger 26, the charging relay 27 and the like.

What is claimed is:

1. An electric power supply control apparatus for a vehicle, which includes a motor provided as a drive power source of a vehicle and a battery provided as an electric power source for the motor, the electric power supply control system comprising:
   a main relay provided between the motor and the battery and including a positive-side switch and a negative-side switch; and
   a relay control unit configured to control the main relay to a one-side off-state, in which only one of the positive-side switch and the negative-side switch of the main relay is turned off, when the main relay is switched over from an on-state to an off-state.

2. The electric power supply control apparatus according to claim 1, wherein:
   the relay control unit is configured to select one of the positive-side switch and the negative-side switch of the main relay, the number of operations of which is smaller, to be turned off, in switching over the main relay to the one-side off-state.

3. The electric power supply control apparatus according to claim 1, further comprising:
   a charging relay provided between the battery and an external power source connector, which is connectable to an external electric power source provided outside the vehicle, and including a positive-side switch and a negative-side switch,
   wherein the relay control unit is configured to control the charging relay to a one-side off-state, in which only one of the positive-side switch and the negative-side switch of the charging relay is turned off, when the charging relay is switched over from an on-state to an off-state.

4. The electric power supply control apparatus according to claim 3, wherein:
   the relay control unit is configured to select one of the positive-side switch and the negative-side switch of the charging relay, the number of operations of which is smaller, to be turned off, in switching over the charging relay to the one-side off-state.

5. The electric power supply control apparatus according to claim 2, further comprising:
   a charging relay provided between the battery and an external power source connector, which is connectable to an external electric power source provided outside the vehicle, and including a positive-side switch and a negative-side switch,
   wherein the relay control unit is configured to control the charging relay to a one-side off-state, in which only one of the positive-side switch and the negative-side switch of the charging relay is turned off, when the charging relay is switched over from an on-state to an off-state.

6. The electric power supply control apparatus according to claim 5, wherein:
   the relay control unit is configured to select one of the positive-side switch and the negative-side switch of the charging relay, the number of operations of which is smaller, to be turned off, in switching over the charging relay to the one-side off-state.

* * * * *